CENTRIFUGALLY RELEASED CLUTCH

Original Filed Nov. 29, 1963 2 Sheets-Sheet 1

INVENTORS
WALTER T. SELSTED
WILLIAM I. GIRDNER
BY A. C. Smith

CENTRIFUGALLY RELEASED CLUTCH

Original Filed Nov. 29, 1963 2 Sheets-Sheet 2

INVENTORS
WALTER T. SELSTED
WILLIAM I. GIRDNER
BY
A. C. Smith 3,298,490

CENTRIFUGALLY RELEASED CLUTCH

Walter T. Selsted, Woodside, and William I. Girdner, Portola Valley, Calif., assignors to Hewlett-Packard Company, Palo Alto, Calif., a corporation of California

Original application Nov. 29, 1963, Ser. No. 326,811, now Patent No. 3,270,935, dated Sept. 6, 1966. Divided and this application Sept. 22, 1965, Ser. No. 489,363
1 Claim. (Cl. 192—104)

This is a divisional application of our application Serial Number 326,811, entitled, Tape Recording and Reproducing Apparatus, filed November 29, 1963, and now Patent Number 3,270,935, granted Sept. 6, 1966.

This invention relates to improved tape recording and reproducing apparatus, which operates over a wide range of tape speeds.

It is an object of the present invention to provide capstan drive apparatus which provides a wide range of tape speeds and which accelerates the tape to high speed in a manner which obviates the need for mechanisms to take up excessive tape slack during the acceleration period.

Other and incidental objects of the present invention will be apparent from a reading of this specification and an inspection of the accompanying drawing in which.

Figure 1:
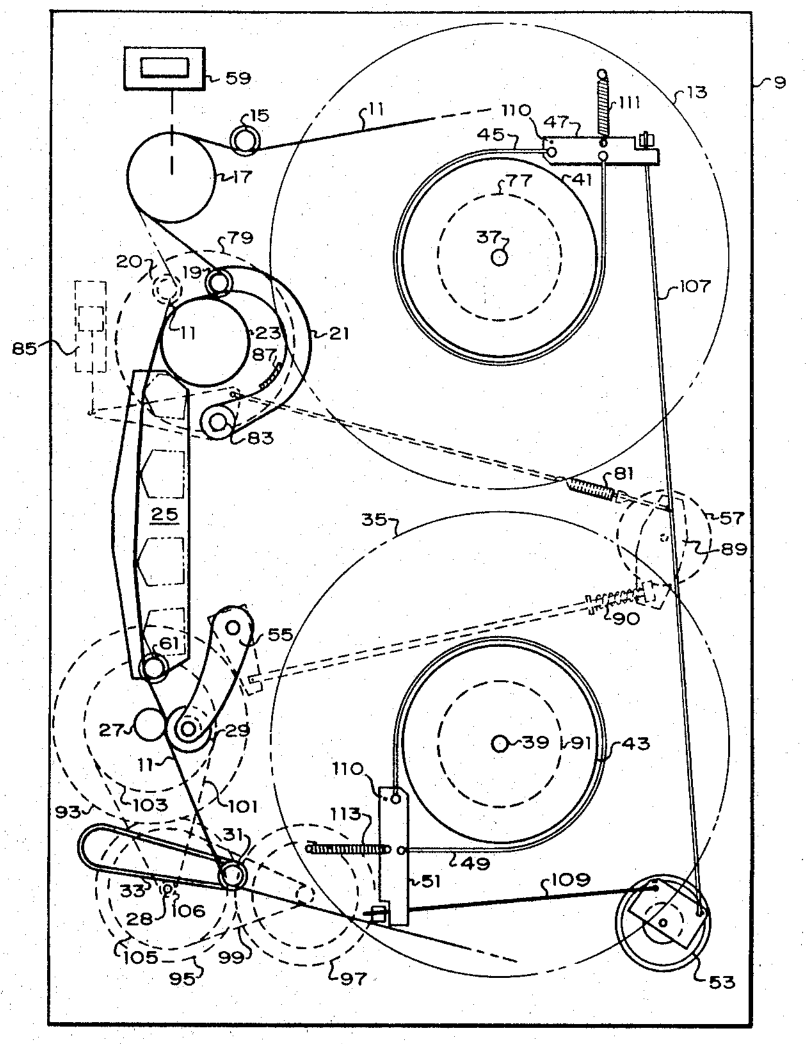
FIGURE 1 is a top view of the tape recording and reproducing apparatus showing the location of components on the base plate.
Figure 2:
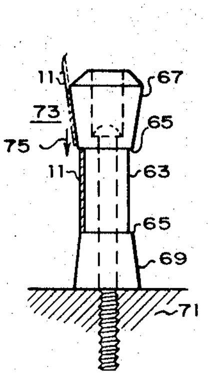
FIGURE 2 is a front view of a tape guide used in the tape recording and reproducing apparatus of the present invention.

Referring now to FIGURE 1, the tape recording and reproducing apparatus is shown assembled on base plate 9. The tape 11 from supply reel 13 follows a path around guide 15, roller 17, guide 19 mounted on rotatable arm 21, the flywheel roller 23 and through the assembly of signal transducer heads 25. The tape 11 is pulled through this path by the capstan drive which includes the capstan shaft 27 and pinch roller 29. The tape 11 then follows the path around guide 31 mounted on rotatable arm 33 to the take-up reel 35. The supply reel 13 is mounted on the rotatable shaft 37 of motor 77. The brakeband 45 which has both of its ends mounted on a pivotal arm 47 is disposed around substantially the entire periphery of brakedrum 41. The pivotal arm 47 is actuated by spring 111 when the hold-off solenoid 53 is de-energized. A similar brake mechanism including brakeband 49 having its both ends mounted on pivotal arm 51 and disposed around substantially the entire periphery of brakedrum 43 is provided for take-up reel 35. This brake is actuated by spring 113 when solenoid 53 is de-energized. The pinch roller 29 mounted on rotatable arm 55 and tape guide 19 mounted on rotatable arm 21 are actuated by solenoid 57. A footage counter 59 is mechanically driven from the roller 17 and thus provides an indication of the number of feet of tape 11 passing over roller 17.

Figure 3:
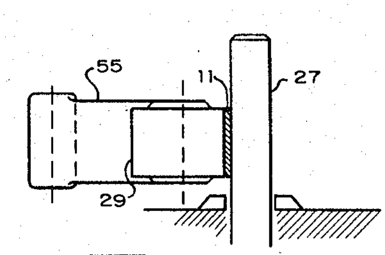
FIGURE 3 is a front view of the capstan shaft and pinch roller in operating position.

The tape speed is determined by the capstan drive mechanism of the present tape recording and reproducing apparatus. This capstan drive includes a shaft 27 which rotates at a selected angular velocity and a pinch roller 29 which urges the tape 11 against the shaft from the rear side of the tape. This pinch roller is mounted on rotatable arm 55 and is actuated by an arm 89 on the solenoid 57 through a lever arm and connecting rod. Spring 90 determines the force with which roller 29 urges the tape 11 against capstan shaft 27. The roller 29 is made not wider than tape 11 as shown in FIGURE 3 so that the only driving force for the tape is determined by the coefficient of friction between the surface of tape 11 and the surface of shaft 27 multiplied by the force which the roller 29 exerts against the back side of the tape 11. Conventional type pinch rollers are generally made wider than the tape so that the resilient material of which the roller is made makes contact with the surface of shaft 27. This type of pinch roller exhibits a much higher effective coefficient of friction between the tape and the capstan shaft because of the driving force exerted on the back side of the tape 11 by the roller in addition to the driving force exerted on the front side of the tape by the capstan shaft. The pinch roller of the present invention thus enables the tape to accelerate to high speeds at a rate which is determined only by the coefficient of friction between the front side of the tape 11 and capstan shaft 27. As a result, motor 91 driving the take-up reel 35 need only be capable of accelerating the reel sufficiently rapidly to take up the tape 11 as it accelerates to a speed determined by the angular velocity of capstan shaft 27. This obviates the need for complex apparatus to take up excessive tape slack following the initial engagement of a conventional pinch roller against the tape and capstan shaft.

Figure 4:
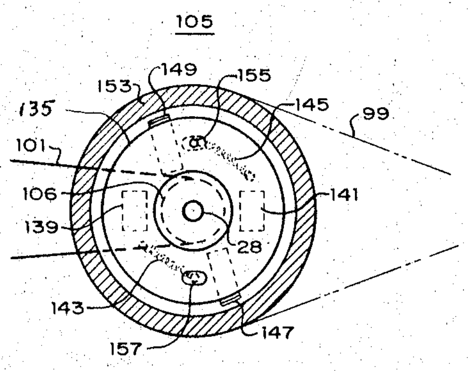
FIGURE 4 is a top view of a centrifugal clutch used in the capstan drive mechanism of the present invention.
Figure 5:
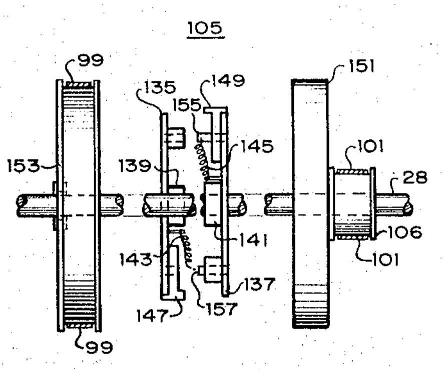
FIGURE 5 is an exploded view of the centrifugal clutch used in the capstan drive mechanism of the present invention.
Figure 6:
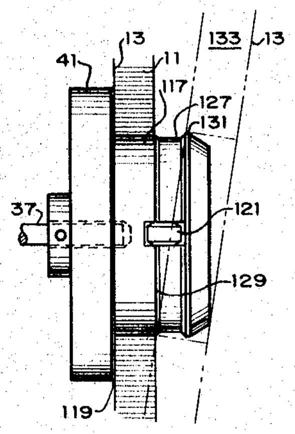
FIGURE 6 is a side view of the tape reel hold-down assembly.
Figure 7:
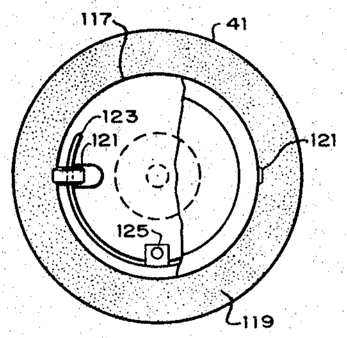
FIGURE 7 is a front view of the tape reel hold-down assembly.

The capstan shaft 27 must operate at such angular velocities as provide conventional tape speeds ranging from 1⅞ inches per second to 60 inches per second. This wide range of speeds may be provided economically by using a plurality of motors operating through speed-changing mechanism rather than by using a single capstan motor. The speed-changing mechanism mechically connecting the three motors 93, 95 and 97 includes belts 99 and 101 and centrifugally-actuated clutches 103 and 105 attached to motors 93 and 95 respectively. Each of these centrifugally-actuated clutches is constructed in a manner substantially as shown in FIGURES 4 and 5. This clutch includes upper and lower annular ring members 135 and 137 pivoted to a driven member 151 by pivot pins 155 and 157, each member including a weight 139, 141, an engaging spring 143, 145 and a friction surface 147, 149. At low angular velocities of the driven member 151 the springs 143, 145 hold the friciton surfaces 147, 149 in engagement with the driver member 153. This becomes locking engagement in one rotation direction and mere sliding engagement in the opposite rotation direction because of the location of the friction surfaces 147, 149 on chords through pivots 155, 157 which are shorter than the inner diameter of driver member 153. At high angular velocities the weights 139, 141 swing outwardly against the forces of springs 143, 145, thereby carrying the friction surfaces 147, 149 mounted on pivoted members 135, 137 inwardly away from the inner surface of driver member 153. Complete disengagement of the driver and driven members 151, 153 is thus effected. Also since the weights 139, 141 swing outward simultaneuosly, dynamic balance of the clutch assembly about shaft 28 is preserved. Inner member 151 is mounted on the shaft of a motor which has a higher angular velocity than the belt-driven outer member 153. This permits the shaft 28 to be belt-driven through the clutch assembly at lower-than-normal motor speeds and permits the shaft 28 to rotate at normal motor speeds free of the outer member 153 and the belt driving apparatus attached thereto.

We claim:

In a driving capstan for tape recording and reproducing apparatus, a clutch comprising:

a cup-shaped driving member and a driven member independently rotatable about a common axis;

a pair of annular rings pivotable about diametrically opposed pivots on said driven member;

a friction surface on each of said rings disposed to engage the inner cylindrical surface of said driving member;

each of said friction surfaces being disposed along an axis which passes through the pivot for an annular ring at a distance from such pivot which is shorter than the diameter of said inner cylindrical surface;

a spring for each oring disposed between a point on one ring and the pivot of the other ring for urging said rings in directions to engage said friction surfaces with said inner cylindrical surface of the driving member;

said rings being weighted to exert force against said springs in response to angular rotation of said driven member for urging the rings in directions to disengage said friction surfaces from said inner cylindrical surface of said driving member.

References Cited by the Examiner

UNITED STATES PATENTS

| | | | |
|---|---|---|---|
| 756,363 | 4/1904 | Helfers | 192—104 |
| 1,418,350 | 6/1922 | Asplund | 192—104 |
| 2,398,087 | 4/1946 | Dodge | 192—104 |

DAVID J. WILLIAMOWSKY, *Primary Examiner.*

BENJAMIN W. WYCHE III, *Examiner.*